Dec. 8, 1931.  N. WALLACE  1,835,681
FUR FASTENER
Filed Feb. 4, 1931
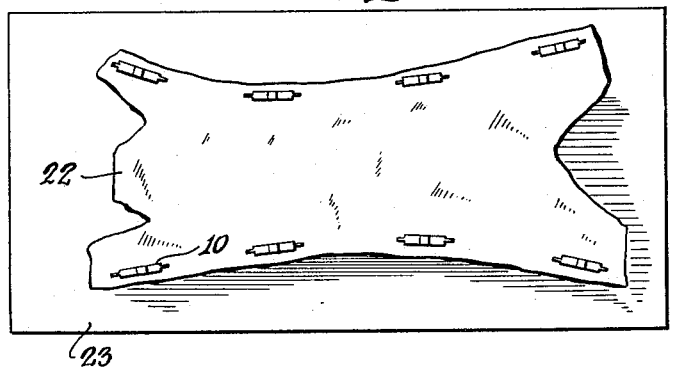
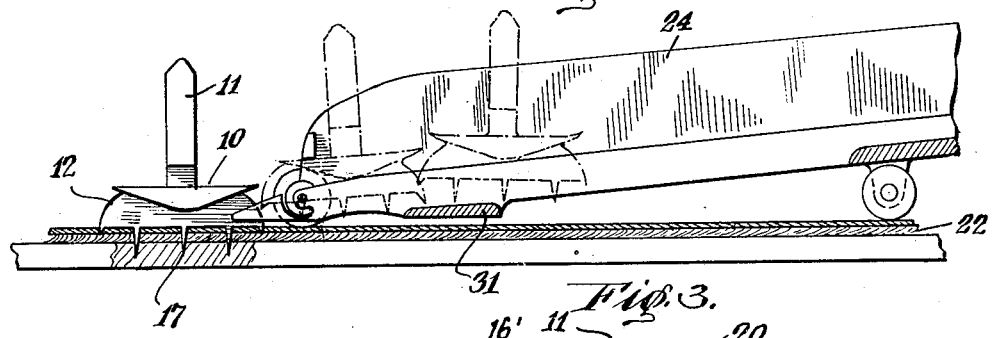
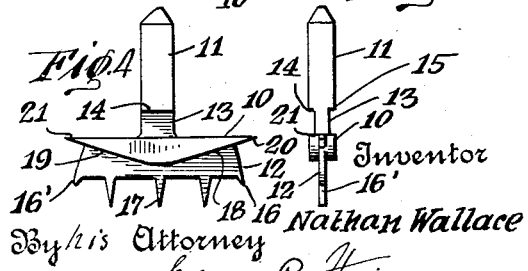
Inventor
Nathan Wallace
By his Attorney Patented Dec. 8, 1931

1,835,681

UNITED STATES PATENT OFFICE

NATHAN WALLACE, OF BROOKLYN, NEW YORK

FUR FASTENER

Application filed February 4, 1931. Serial No. 513,251.

This invention relates to improvements in fur handling devices, particularly to a fur fastener, and it is the principal object of my invention to provide a fastener of simple and therefore inexpensive construction, yet durable and highly efficient in operation.

Another object of my invention is the provision of a fur fastener having a body equipped with a stem reduced at its lower end and adapted to be engaged by inner lugs of a channeled tool to readily lift the fastener from the fur.

Still another object of my invention is the provision of a fur fastener having a plurality of fur engaging nails integrally formed therewith.

These and other objects and advantages of my invention will become more fully known as the description thereof proceeds, and will then be specifically defined in the appended claims.

In the accompanying drawings forming a material part of this disclosure:

Fig. 1 is a plan view of a piece of fur secured to its support by a fastener constructed according to my invention.

Fig. 2 illustrates in sectional side elevation the tool in the various stages of its operation.

Fig. 3 is a top plan view of the fastener.

Fig. 4 is a side elevation thereof.

Fig. 5 is an end elevation of the fastener.

As shown in Figures 3, 4 and 5, the fastener constructed according to my invention comprises a body 10 which has integrally formed therewith a handle or stem 11, and a blade 12. The stem is reduced at its lower end, as at 13 forming the shoulders 14 and 15, while the blade 12 has formed therewith at its ends sharp end teeth 16, 16' and a plurality of sharp teeth 17. The body 10 has also formed therewith lateral projections near its upper end forming lower inclined or converging shoulders 18, 19, and end pins 20, 21.

As shown in Figure 1 the fasteners have secured a piece of fur 22 to a table 23 or other support.

When it is desired to remove the fasteners from their fur fastening position, a suitable tool is used.

The operation of my device will be clearly understood from the above description and by reference to the drawings, and it will be apparent that if it is desired to remove the fastening devices from the fur and its support, the reduced portion 13 of stem 11 is engaged by a suitable tool and a movement of the tool towards the fasteners and a downward movement of the tool handle will lift the fastener from engagement with the fur.

It will be understood that I have shown and described the preferred forms of my device only as examples of the many possible ways to practically construct the same, and that I may make such changes in the general arrangement of my device and in the construction of the minor details thereof as come within the scope of the appended claims without departure from the spirit of my invention.

Having thus described my invention, what I claim as new and desire to secure by Letters Patent is:

1. A fur fastener comprising a body, a stem for said body having a reduced lower end, a blade carried by said body and a plurality of teeth formed with said blade, and lateral extensions on said body for guiding said body into and in a channeled tool by means of which the fastener is removed from the workpiece.

2. A fur fastener comprising a body, a stem for said body having a reduced lower end, a blade formed with and projecting from the longitudinal center of said body, a plurality of teeth formed at the ends and the lower edge of said body, said body extending laterally beyond each side of said blade, said lateral extensions tapering from their center toward each end and adapted to be engaged by a tool for lifting the fastener from the work piece and guiding of the fasteners into said tool.

Signed at New York, in the county of New York, and State of New York, this 3rd day of February, A. D. 1931.

NATHAN WALLACE.